(12) United States Patent
McNamara

(10) Patent No.: US 10,130,043 B1
(45) Date of Patent: Nov. 20, 2018

(54) CHAINSAW FOR TRIMMING PALM TREES

(71) Applicant: Larry McNamara, Englewood, FL (US)

(72) Inventor: Larry McNamara, Englewood, FL (US)

( * ) Notice: Subject to any disclaimer, the term of this patent is extended or adjusted under 35 U.S.C. 154(b) by 0 days.

(21) Appl. No.: 15/376,765

(22) Filed: Dec. 13, 2016

(51) Int. Cl.
*A01G 3/08* (2006.01)
*B27B 17/12* (2006.01)
*B27B 17/02* (2006.01)

(52) U.S. Cl.
CPC ............. *A01G 3/086* (2013.01); *B27B 17/02* (2013.01); *B27B 17/12* (2013.01)

(58) Field of Classification Search
CPC .......... A01G 3/086; B27B 17/12; B27B 17/02
See application file for complete search history.

(56) References Cited

U.S. PATENT DOCUMENTS

| | | | | |
|---|---|---|---|---|
| 2,703,928 | A * | 3/1955 | Southwick | A01G 3/08 29/463 |
| 2,827,932 | A * | 3/1958 | Strunk | B27B 17/02 30/123.4 |
| 3,343,613 | A * | 9/1967 | Carnesecca, Jr. | A01G 3/033 173/169 |
| 4,760,646 | A | 8/1988 | Siegler | |
| 5,685,080 | A | 11/1997 | Amano | |
| 5,709,032 | A * | 1/1998 | Mizutani | B27B 17/083 188/77 R |
| 5,884,403 | A | 3/1999 | Rogers | |
| D408,246 | S | 4/1999 | Juratovac | |
| 6,105,263 | A * | 8/2000 | Stones | B27B 17/083 30/382 |
| 6,148,524 | A * | 11/2000 | Nitschmann | B27B 33/14 30/381 |
| 6,588,110 | B2 * | 7/2003 | Galster | B27B 17/02 30/382 |
| 7,930,833 | B2 | 4/2011 | Baskar | |
| 8,156,654 | B2 | 4/2012 | Reed | |
| 9,713,880 | B2 * | 7/2017 | Haneda | B27B 17/00 |
| 9,815,220 | B2 * | 11/2017 | Madson | B27B 17/08 |
| 2002/0112355 | A1 * | 8/2002 | Mang | B27B 17/04 30/384 |
| 2015/0273721 | A1 * | 10/2015 | Harer | B23D 59/006 30/383 |
| 2015/0336288 | A1 * | 11/2015 | Hallendorff | B27B 17/12 30/383 |

FOREIGN PATENT DOCUMENTS

| | | |
|---|---|---|
| DE | 19531450 A1 | 6/2002 |
| DE | 20 2015 001 919 U1 * | 7/2015 |
| EP | 0 306 767 A1 * | 3/1989 |

* cited by examiner

Primary Examiner — Hwei C Payer

(57) ABSTRACT

The chainsaw for trimming palm trees is a mechanical cutting device. The chainsaw for trimming palm trees operates in the manner of a chainsaw. Specifically, the chainsaw for trimming palm trees is a chainsaw blade that is powered by and electrically powered motor. The electrically powered motor is mounted in a housing. Unlike a traditional chainsaw, the chainsaw blade is mounted with an offset angle relative to the housing such that the center axis of the chainsaw blade is not parallel to the center axis of the housing. This offset angle is optimized for the purpose of cutting one or more palm fronds off the palm tree from a direction of attack that is below the one or more palm fronds of the palm tree. The chainsaw for trimming palm trees comprises a chainsaw blade and a drive and safety system.

2 Claims, 4 Drawing Sheets

CHAINSAW FOR TRIMMING PALM TREES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of saws for wood or similar materials including band and strap saws, more specifically, chainsaw with an angled driven blade.

The trimming of palm trees is a high risk activity that is done at a high elevation and a high vertical angle. The risk is further increased because the trimming of the palm tree is done from below the fronds that are being trimmed. This odd direction of attack makes the use of power tools an increased risk because the power tool is being used in a manner in which it is not intended. Clearly, a powered tool designed specifically for pruning palm trees would reduce the time required at high elevation and high vertical angle and would be of benefit to arborists.

SUMMARY OF INVENTION

The current disclosure addresses the above issue.

The chainsaw for trimming palm trees is a mechanical cutting device that is configured for use in cutting one or more fronds off of a palm tree. The chainsaw for trimming palm trees operates in the manner of a chainsaw. Specifically, the chainsaw for trimming palm trees is a chainsaw blade that is powered by and electrically powered motor and associated drive mechanism. The electrically powered motor and associated drive mechanism are mounted in a housing. Unlike a traditional chainsaw, the chainsaw blade is mounted with an offset angle relative to the housing such that the center axis of the chainsaw blade is not parallel to the center axis of the housing. This offset angle is optimized for the purpose of cutting one or more palm fronds off the palm tree from a direction of attack that is below the one or more palm fronds of the palm tree.

These together with additional objects, features and advantages of the chainsaw for trimming palm trees will be readily apparent to those of ordinary skill in the art upon reading the following detailed description of the presently preferred, but nonetheless illustrative, embodiments when taken in conjunction with the accompanying drawings.

In this respect, before explaining the current embodiments of the chainsaw for trimming palm trees in detail, it is to be understood that the chainsaw for trimming palm trees is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the chainsaw for trimming palm trees.

It is therefore important that the claims be regarded as including such equivalent construction insofar as they do not depart from the spirit and scope of the chainsaw for trimming palm trees. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
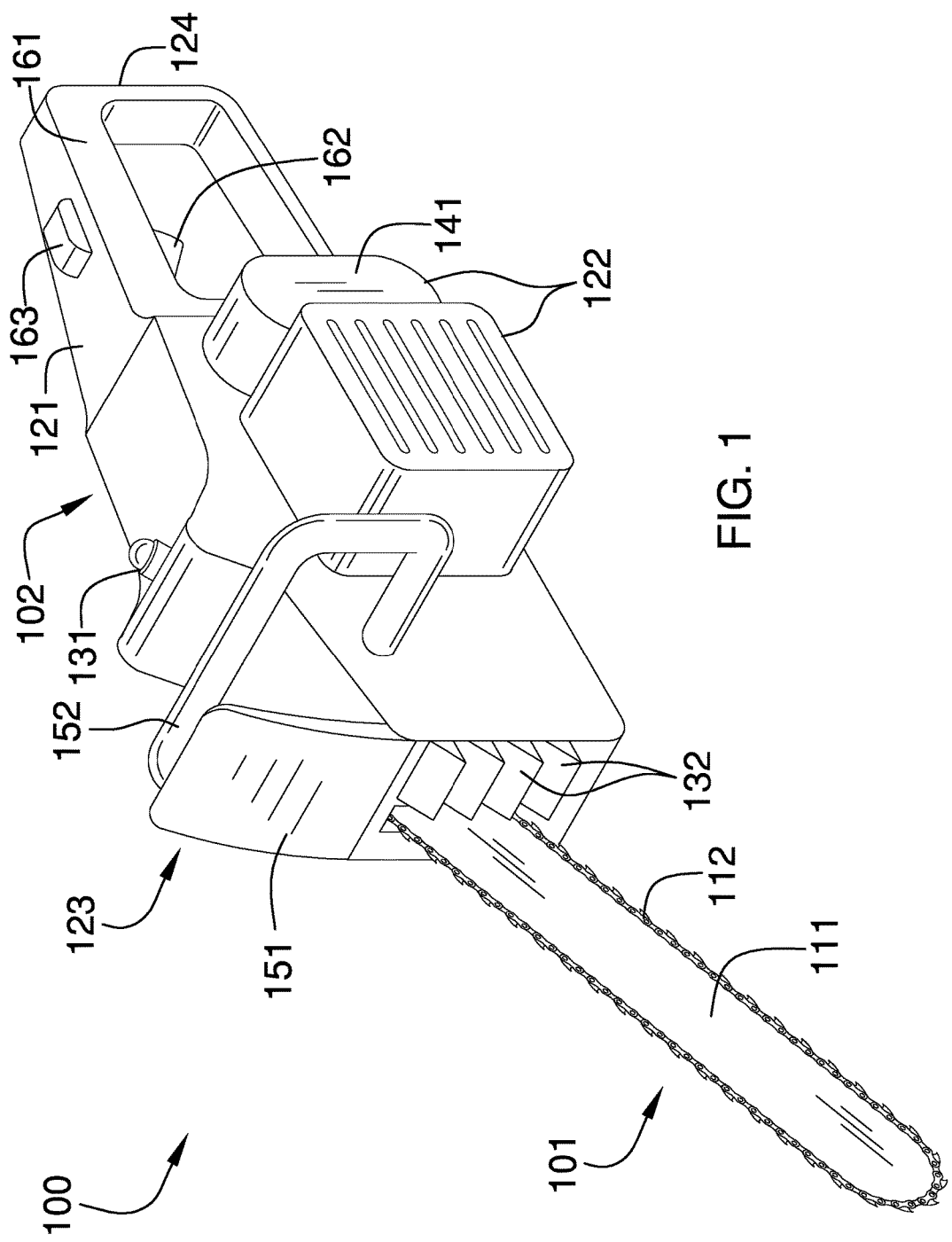
FIG. 1 is a perspective view of an embodiment of the disclosure.
Figure 2:
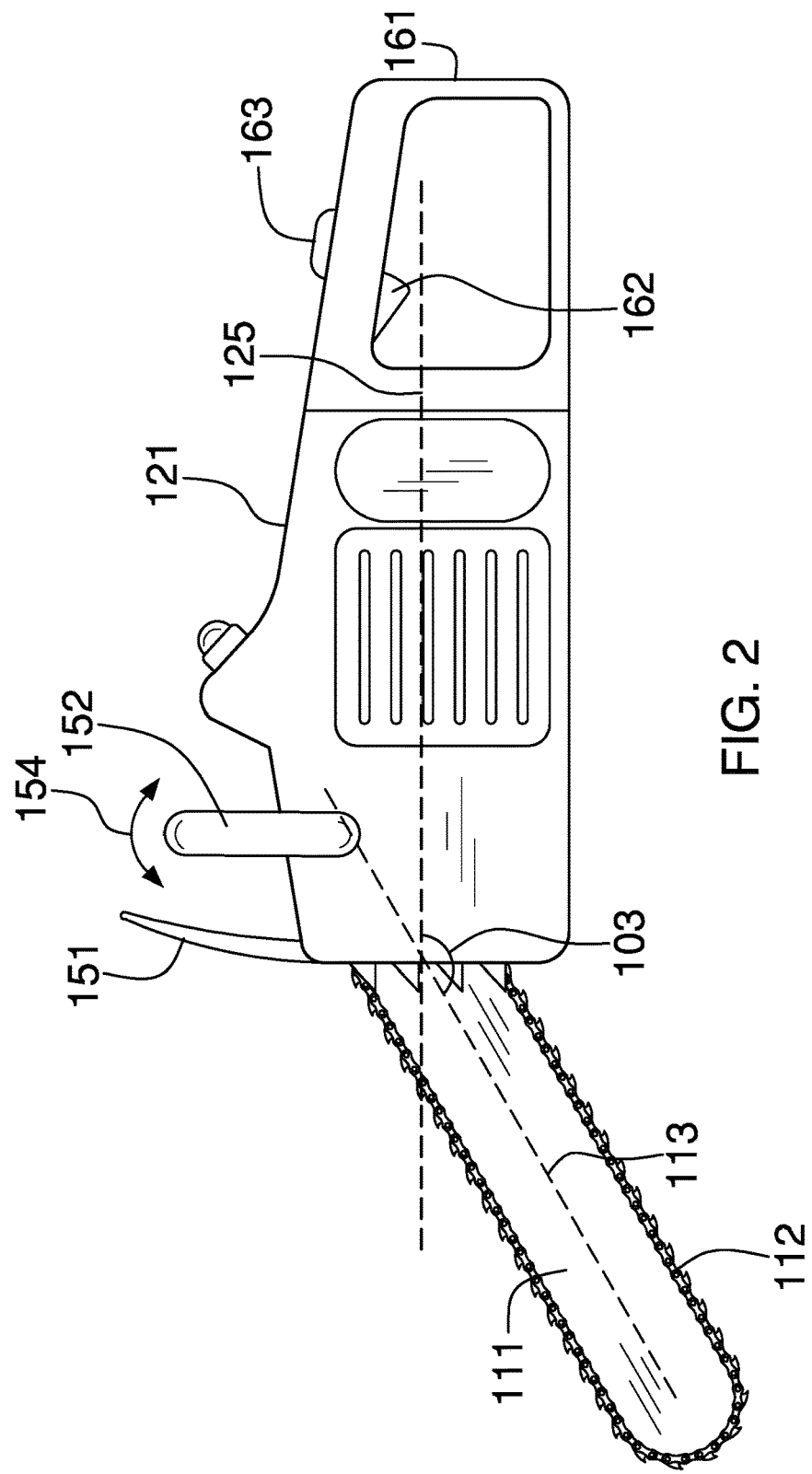
FIG. 2 is a side view of an embodiment of the disclosure.
Figure 3:
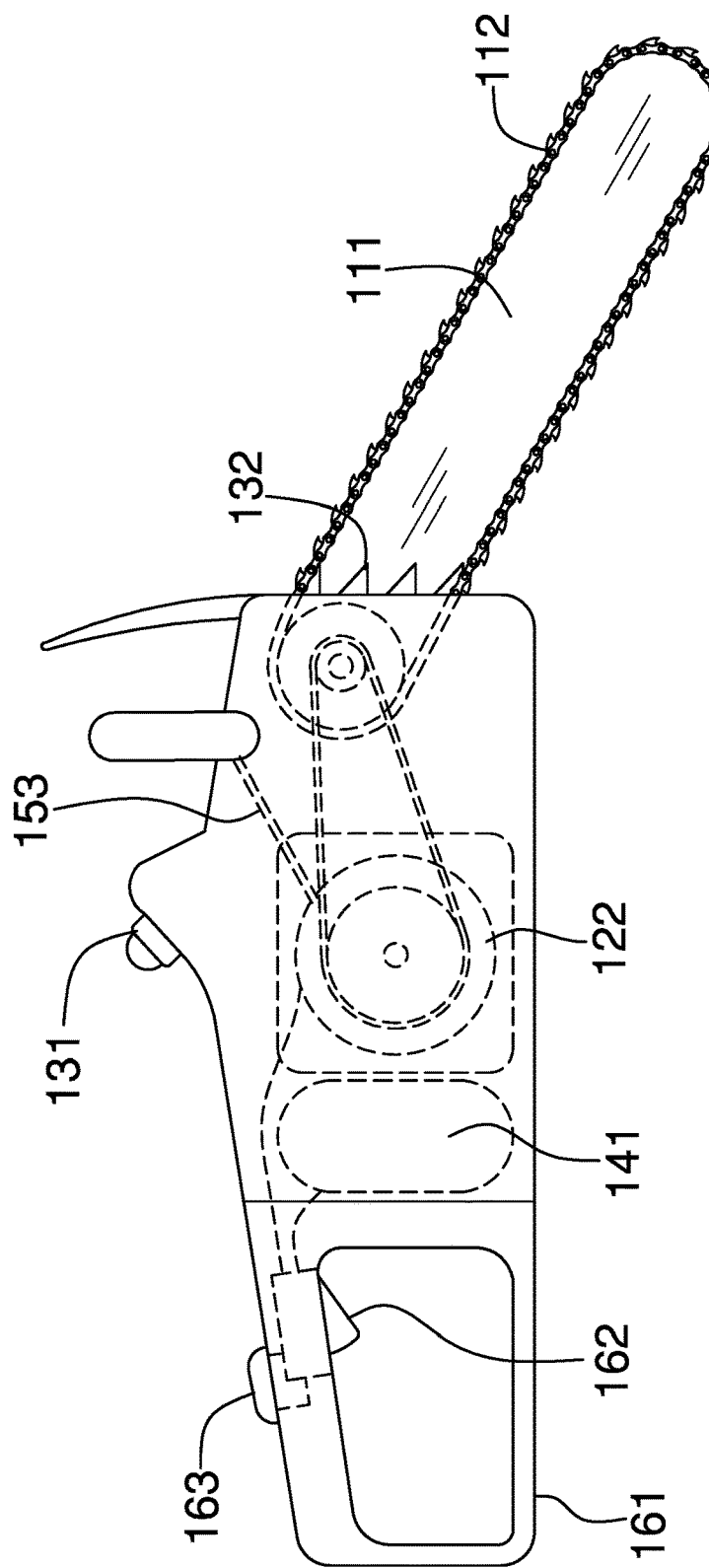
FIG. 3 is a reverse side view of an embodiment of the disclosure.
Figure 4:
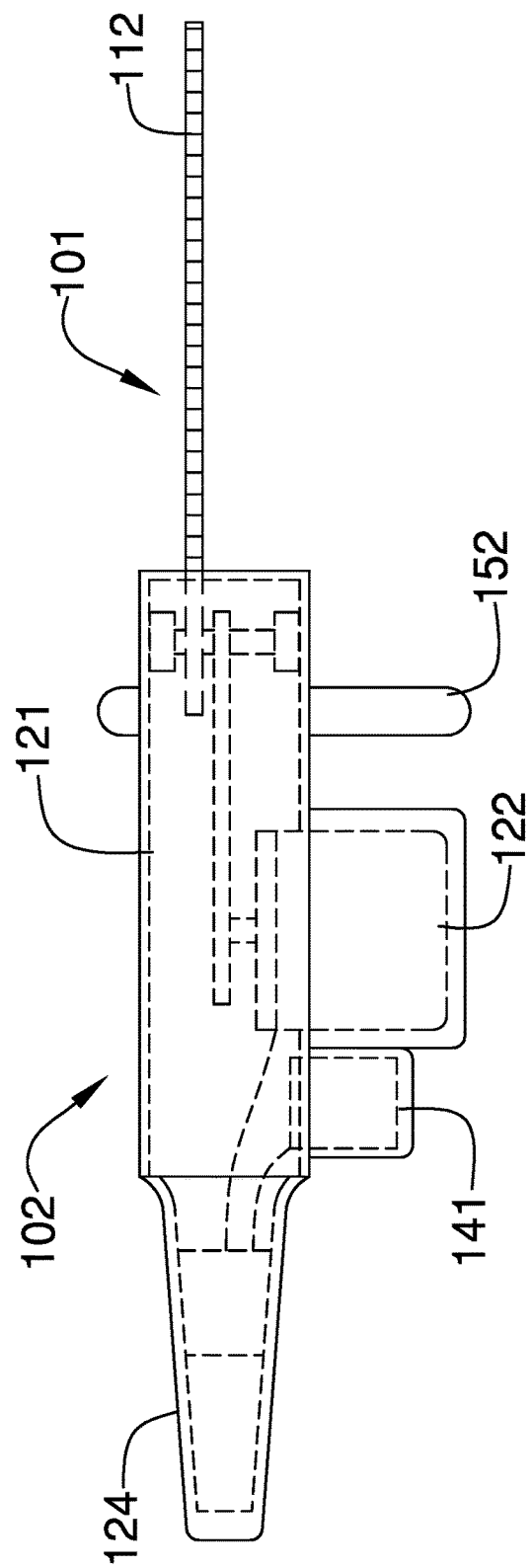
FIG. 4 is a bottom view of an embodiment of the disclosure.

Detailed reference will now be made to one or more potential embodiments of the disclosure, which are illustrated in FIGS. 1 through 4.

The chainsaw for trimming palm trees 100 (hereinafter invention) comprises a chainsaw blade 101 and a drive and safety system 102. The chainsaw blade 101 is mounted on the drive and safety system 102. The invention 100 is a mechanical cutting device that is configured for use in cutting one or more fronds off of a palm tree. The invention 100 operates in the manner of a chainsaw. Unlike a traditional chainsaw, the axis of the chainsaw blade 101 is offset relative to the drive and safety system 102 such that the center axis of the chainsaw blade 101 is not parallel to the center axis of the drive and safety system 102. This offset is called the offset angle 103. The offset angle 103 is optimized for the purpose of cutting one or more palm fronds off the palm tree from a direction of attack that is below the one or more palm fronds of the palm tree.

The chainsaw blade 101 is the cutting component of the invention 100. The chainsaw blade 101 is used to physically remove unwanted fronds from the palm tree. The chainsaw blade 101 comprises a guide bar 111 and a cutting chain 112. The guide bar 111 is an oval shaped structure plate structure around which the cutting chain 112 is wrapped. The guide bar 111 guide the rotation of the cutting chain 112 during operation of the invention 100. The cutting chain 112 is a chain link structure similar to the drive chains used on a bicycle or motorcycle. The cutting chain 112 has formed on it a plurality of cutting teeth that provide the cutting action of the invention 100. The cutting chain 112 is mounted to and rotates around the guide bar 111 during the normal use of the invention 100. Methods to form chainsaw blades 101 as described in this paragraph are known and documented. The guide bar 111 is further defined with a bar axis 113. As shown most clearly in FIG. 2, the bar axis 113 is a hypothetical axis formed on the guide bar 111 that corresponds to the major axis of an ellipse.

The drive and safety system 102 is the component of the invention 100 that: 1) rotates the chainsaw blade 101 during the use of the invention 100; and, 2) implements a plurality of safety features supporting the safe operation of the invention 100. The drive and safety system 102 comprises a housing 121, a drive motor 122, a front guard 123, and a rear guard 124. As shown most clearly in FIG. 2, the drive and safety system 102 is further defined with a drive axis 125. The drive axis 125 is a hypothetical axis formed within the housing 121 that is used as a reference to determine the offset angle 103. The drive axis 125 is roughly intended to correspond to the vertical axis during the use of the invention 100.

The offset angle 103 is a measure of the angle formed between the chainsaw blade 101 and the drive and safety system 102. Specifically, the offset angle 103 is the angle formed between the bar axis 113 and the drive axis 125. The offset angle 103 is optimized for cutting a selected object from a direction of attack that is below the selected object. This direction of attack is typically required when trimming a palm tree.

The housing 121 is a rigid structure that: 1) houses the drive motor 122, the front guard 123, and the rear guard 124; and, 2) attaches the chainsaw blade 101 to the drive motor 122. The housing 121 comprises an oiler 131 and a plurality of bumper spikes 132. The oiler 131 is an aperture formed through the housing 121. The oiler 131 provides access to the cutting chain 112 for the purpose of oiling the cutting chain 112 for maintenance purposes. The plurality of bumper spikes 132 are a series of projections that project away from the surface of the drive and safety system 102 that is proximal to the chainsaw blade 101. The purpose of the plurality of bumper spikes 132 is to guide the chainsaw blade 101 during the use of the invention 100. The use of bumper spikes is well known and documented by chainsaw manufacturers.

The drive motor 122 is an electric motor that is used to drive the cutting chain 112 around the guide bar 111 during cutting activities. The drive motor 122 further comprises a battery 141. Methods to attach a chainsaw blade 101 to a drive motor 122 are well known and documented by chainsaw manufacturers. The battery 141 is a chemical device that stores chemical energy in a manner that is converted into electrical energy that is used to operate the drive motor 122. The use of an electric motor as the drive motor 122 is preferred in this application because: 1) it relatively light weight; and, 2) of the relatively low power required from the drive motor 122 to cut palm fronds compared to the power typically required by a more traditional chainsaw.

The front guard 123 is a structure that attaches to the housing 121 and that is used to manipulate the invention 100. The front guard 123 comprises a guard plate 151, a front grip 152, and a chain brake 153. The guard plate 151 is a barrier that is positioned between the front grip 152 and the chainsaw blade 101. The purpose of the guard plate 151 is to protect that hand from debris that may be generated by the chainsaw blade 101. The front grip 152 is a hand grip. The front grip 152 is used to: 1) manipulate the invention 100; and, 2) manipulate the chain brake 153. As shown most clearly in FIG. 2, the front grip 152 rotates 154 around a pivot in order to operate the chain brake 153. Changes in the angular position of the front grip 152 relative to the drive axis 125 are used to engage and disengage the chain brake 153. The chain brake 153 is a mechanical device that is used to stop the rotation of the cutting chain 112 around the guide bar 111. The use of chain brakes 153 are well known and documented among chainsaw manufacturers.

The rear guard 124 is a structure that attached to the housing 121 and that is used to manipulate the invention 100. The rear grip 161 is a hand grip that is mounted on the drive and safety system 102 in a location that is distal from the chainsaw blade 101. The rear guard 124 comprises a rear grip 161, a trigger 162, and a safety 163. The trigger 162 is a trigger grip switch that is used to engage and disengage the rotation of the chainsaw blade 101. The safety 163 is a mechanical safety device that inhibits the operation of the trigger 162 for safety purposes. The safety 163 is also commonly referred to as a throttle lock in a traditional chainsaw. The use of a trigger 162 and a safety 163 are well known and documented among chainsaw manufacturers.

The following definitions were used in this disclosure:

Battery: As used in this disclosure, a battery is a container consisting of one or more cells, in which chemical energy is converted into electricity and used as a source of power.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid casing that encloses and protects one or more devices.

Oval: As used in this disclosure, an oval is a geometric shape that is formed in the shape of a "squished" circle similar in form to an ellipse. The difference between an oval and an ellipse is that an ellipse can be described by a mathematical formula while an oval has no such description.

Pivot: As used in this disclosure, a pivot is a rod or shaft around which an object rotates or swings.

Plate: As used in this disclosure, a plate is a smooth, flat and rigid object that has at least one dimension that: 1) is of uniform thickness; and 2) that appears thin relative to the other dimensions of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A power tool comprising:
a chainsaw blade and a drive and safety system;
wherein the chainsaw blade is mounted on the drive and safety system;
wherein the power tool is a mechanical cutting device that is adapted to cut one or more fronds from a palm tree;
wherein the chainsaw blade is offset relative to the drive and safety system such that a reference axis of the chainsaw blade is not parallel to a reference axis of the drive and safety system;
wherein this offset is called an offset angle;
wherein the offset angle facilitates cutting one or more palm fronds off the palm tree from a direction of attack that is below the one or more palm fronds of the palm tree;
wherein the chainsaw blade comprises a guide bar and a cutting chain;
wherein the chainsaw blade is a cutting component of the power tool;
wherein the chainsaw blade is used to physically remove unwanted fronds from the palm tree;
wherein the cutting chain attaches to the guide bar;
wherein the guide bar is an oval shaped structure plate structure;
wherein the guide bar guides the rotation of the cutting chain during operation of the power tool;
wherein the cutting chain is a chain link structure;
wherein the cutting chain has formed on it a plurality of cutting teeth;
wherein the drive and safety system rotates the chainsaw blade;
wherein the drive and safety system comprises a housing, a drive motor, a front guard, and a rear guard;
wherein the drive motor, the front guard, and the rear guard attach to the housing;
wherein the guide bar extends outwardly from a front of the drive and safety system and downwardly with respect to the front guard and beyond a bottom of the drive and safety system;
wherein the chainsaw blade attaches to the drive motor;
wherein the guide bar is further defined with a longitudinal bar axis;
wherein the drive and safety system is further defined with a longitudinal drive axis;
wherein the offset angle is the angle formed between the longitudinal bar axis and the longitudinal drive axis;
wherein the offset angle is optimized for cutting a selected object from a direction of attack that is below the selected object;
wherein the housing is a rigid structure;
wherein the housing comprises an oiler and a plurality of bumper spikes;
wherein the oiler is an aperture formed through the housing;
wherein the plurality of bumper spikes are a series of projections that project away from a surface of the drive and safety system that is proximal to the chainsaw blade;
wherein the plurality of bumper spikes guides the chainsaw blade during the use of the power tool;
wherein the drive motor is an electric motor;
wherein the drive motor drives the cutting chain around the guide bar;
wherein the front guard is a structure that attaches to the housing;
wherein the front guard is a tool that is used to manipulate the power tool;
wherein the front guard comprises a guard plate, a front grip, and a chain brake;
wherein the guard plate is a barrier that is positioned between the front grip and the chainsaw blade;
wherein the front grip is a hand grip;
wherein the front grip manipulates the power tool;
wherein the front grip manipulates the chain brake;
wherein changes in the angular position of the front grip relative to the drive axis are used to engage and disengage the chain brake;
wherein the chain brake is a mechanical device that is used to stops the rotation of the cutting chain around the guide bar;
wherein the rear guard is a structure that attached to the housing;
wherein the rear guard is used to manipulate the power tool;
wherein a rear grip is a hand grip that is mounted on the housing in a location that is distal from the chainsaw blade;
wherein the rear guard comprises the rear grip, a trigger, and a safety;
wherein the trigger is mounted on the rear grip;
wherein the safety is mounted on the rear grip;
wherein the trigger is a trigger grip switch that is used to engage and disengage the rotation of the chainsaw blade;
wherein the safety is a mechanical safety device that inhibits the operation of the trigger.

2. The power tool according to claim 1 wherein the drive motor further comprises a battery.

* * * * *